R. HINES & L. BEYER.
Improvement in Machines for Sharpening Saws.
No. 116,190.    *Fig. 1*    Patented June 20, 1871.
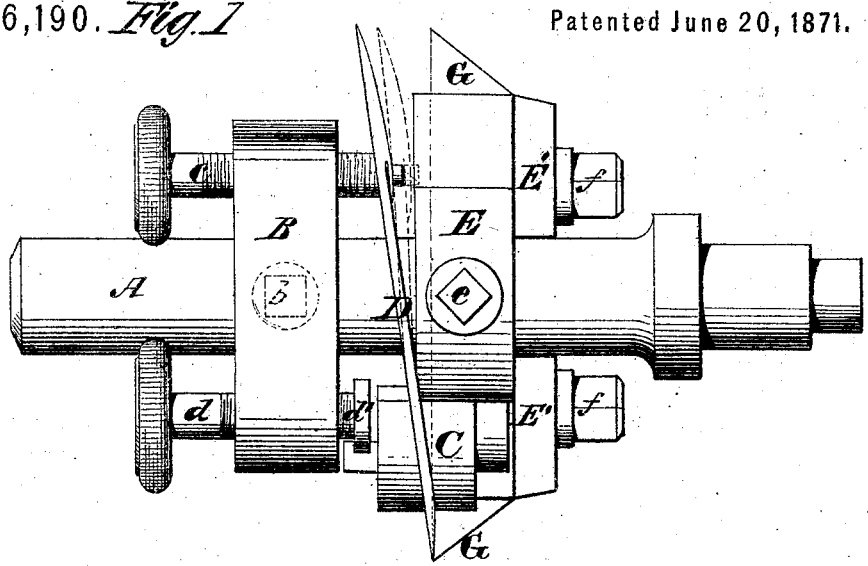
*Fig. 2*    *Fig. 3*
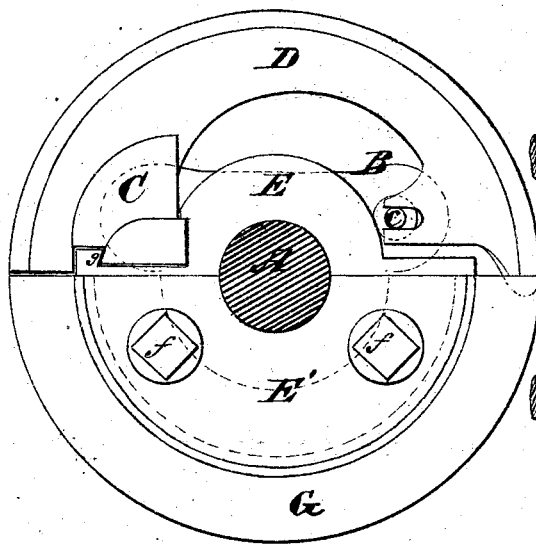 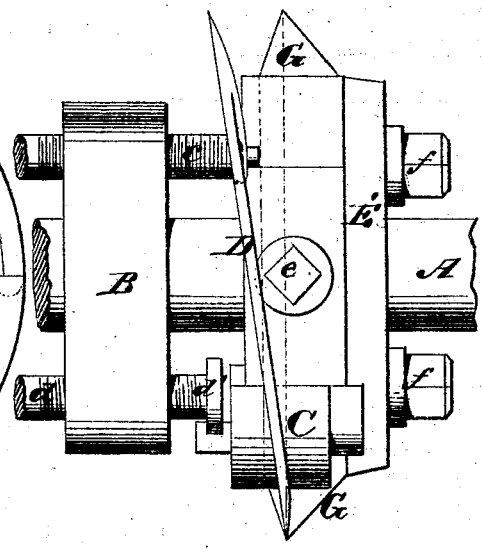
Witnesses.
R. Campbell
Inventors
Rudolph Hines & Louis Beyer
by his Atty's
Mason, Fenwick & Lawrence

UNITED STATES PATENT OFFICE.

RUDOLPH HINES AND LOUIS BEYER, OF WASHINGTON, D. C.

IMPROVEMENT IN MACHINES FOR SHARPENING SAWS.

Specification forming part of Letters Patent No. 116,190, dated June 20, 1871.

*To all whom it may concern:*

Be it known that we, RUDOLPH HINES and LOUIS BEYER, of Washington, District of Columbia, have invented a new and Improved Saw-Sharpener; and we do hereby declare that the following is a full, clear, and exact description thereof, reference being had to the accompanying drawing making part of this specification, in which—

Figure 1 is a view of one side of the combined saw-feeder and sharpener applied on their arbor. Fig. 2 is an end view of the same. Fig. 3 shows the feeder adjusted for a sharpener for crosscut-saws.

Similar letters of reference indicate corresponding parts in the several figures.

This invention relates to an improvement on the saw-feeder for which application for Letters Patent is made by us bearing even date with the filing of this. The object of this invention is to employ an adjustable flexible segment for feeding a saw upon its table during the operation of sharpening the teeth, whereby, while the intermittent strokes of the feeder upon the saw can be shortened or lengthened by adjusting, as heretofore, only one end of this feeder, the feeder can also be adjusted at both ends independently, for adapting it to sharpeners for different kinds of saw-teeth, as will be hereinafter explained. Another object of the invention is to provide a support for the adjusting-screws independent of the sharpener-holder; and, further, to so connect the flexible feeder near its free end to the adjusting-screw that it shall be kept from twisting or being deflected out of its true position while feeding a saw along.

To enable others skilled in the art to understand our invention, we will explain its construction and operation.

In our application for Letters Patent for a saw-sharpener, (marked "case A,") and filed at the same time with this, we describe a segment-feeder in combination with a segment-sharpener. The feeder is applied to an adjustable block, and is pivoted to this block so as to be adjustable bodily, and also about its pivot. The feeder D, shown in the annexed drawing, is made of a thin flexible piece of metal, of a segmental shape, with one side beveled. This flexible feeder is secured permanently to a slide, C, which is applied in a dovetail slot, $g$, in a head, E, to which the sharpener G is applied. The segment-feeder is concentric to the axis of the arbor A, and has the same length of radius as the sharpener. This feeder is secured by one end to the slide C, and crosses the arbor A oblique to its axis, one end being continuous with the acute edge of the sharpener, and the other end more or less to one side of the sharpener, as shown in the drawing. One end of the slide C is extended out and notched, and in this notch is fitted a circular head, $d'$, which is on one end of an adjusting-screw, $d$. This screw $d$ is tapped through a block, B, which is secured fast on arbor A by a screw, $b$. The free end of the feeder D bears against a shoulder which is formed on an adjusting-screw, $c$, which is tapped through the fixed block B. The spring action of the feeder keeps its free end against the shouldered end of the screw $c$. The head E is secured fast on the arbor A by a set-screw, $e$, and its semicircular surface is grooved to receive the sharpener G. The cap-plate E' is secured to the head E by means of screws $ff$, and confines the sharpener in place.

It will be seen, by reference to Fig. 1, that a sharpener, G, which is adapted to saw-teeth having one of their edges perpendicular, is secured to the head E, and that the slide C is so adjusted that its end of the feeder D is continuous and in line with the highest point of one end of the sharpener. The opposite or free end of the feeder is adjusted to one side of said line, according to the width of teeth on the saw to be sharpened. In Fig. 3 a sharpener, G, having double beveled surfaces, is confined to the head E. To adapt the feeder to this form of sharpener two adjustments are required, the first being effected by moving the slide C until its end of the feeder is in line with the highest point of the sharpener, and the second being the movement of the free end of the feeder toward or from the sharpener, according to the width of saw-teeth, or the number of teeth it is desired to override. These adjustments are both effected without moving the block B, and by means of two set-screws, $c$ and $d$. The nicety and the facility with which the feeder D can be adjusted make it an important improvement on the plan set forth in our application for a patent marked "case A."

Having described our invention, what we claim as new, and desire to secure by Letters Patent, is—

1. The flexible feeder D, made adjustable at both ends, substantially as and for the purpose described.

2. The fixed head B on arbor A, with adjusting-screws $c\ d$, in combination with the slide C and flexible feeder D, substantially as described.

3. The screw $c$, shouldered and connected to the free end of the feeder D so as to prevent deflection or twisting of said feeder, as described and shown.

RUDOLPH HINES.
LOUIS BEYER.

Witnesses:
 EDM. F. BROWN,
 J. N. CAMPBELL.